US008078669B2

(12) United States Patent
Ladd et al.

(10) Patent No.: US 8,078,669 B2
(45) Date of Patent: Dec. 13, 2011

(54) MEDIA EXTENSION APPARATUS AND METHODS FOR USE IN AN INFORMATION NETWORK

(75) Inventors: Patrick Ladd, San Marcos, CA (US); George W. Sarosi, Charlotte, NC (US)

(73) Assignee: Time Warner Cable Inc., New York, NY (US)

( * ) Notice: Subject to any disclaimer, the term of this patent is extended or adjusted under 35 U.S.C. 154(b) by 1276 days.

(21) Appl. No.: 10/782,680

(22) Filed: Feb. 18, 2004

(65) Prior Publication Data

US 2006/0036750 A1  Feb. 16, 2006

(51) Int. Cl.
   *G06F 15/16* (2006.01)
(52) U.S. Cl. ........ 709/203; 709/219; 709/230; 725/112; 725/111; 725/87; 370/352; 370/356; 370/401
(58) Field of Classification Search .................. 709/203, 709/230, 219; 370/254, 351
   See application file for complete search history.

(56) References Cited

U.S. PATENT DOCUMENTS

| | | | |
|---|---|---|---|
| 6,092,107 A | 7/2000 | Eleftheriadis et al. | |
| 6,181,713 B1 | 1/2001 | Patki et al. | |
| 6,216,152 B1 | 4/2001 | Wong et al. | |
| 6,252,889 B1 | 6/2001 | Patki et al. | |
| 6,631,350 B1 | 10/2003 | Celi, Jr. et al. | |
| 6,631,403 B1 | 10/2003 | Deutsch et al. | |
| 6,654,722 B1 | 11/2003 | Aldous et al. | |
| 6,687,735 B1 * | 2/2004 | Logston et al. | 709/203 |
| 6,762,798 B1 | 7/2004 | Messer et al. | |
| 6,847,649 B2 * | 1/2005 | Sutanto | 370/401 |
| 6,873,877 B1 | 3/2005 | Tobias et al. | |

(Continued)

FOREIGN PATENT DOCUMENTS

WO  WO 0024192  4/2000

OTHER PUBLICATIONS

8th IEEE International Conference on Communication Systems Singapore, Nov. 25-28, 2002 The use of Dynamically Reconfigurable Protocol Stacks for Streaming Multimedia to Mobile Devices by Kevin Curran and Gerard Parr http://www.infm.ulst.ac.uk/~kevin/pubs.htm.*

(Continued)

*Primary Examiner* — Don Wong
*Assistant Examiner* — Tuan-Khanh Phan
(74) *Attorney, Agent, or Firm* — Gazdzinski & Associates, PC

(57) ABSTRACT

Methods and apparatus for extending the capabilities of a client device (e.g., consumer premises equipment in a cable network) using one or more on-demand applications. In one aspect, an improved media handling extension is provided within the device with which the various application(s) can interface to facilitate on-demand interaction between the CPE and the head end or other network entity. In one exemplary embodiment, the client device comprises a digital set-top box (DSTB) having Java-enabled middleware adapted to implement the OCAP/ACAP/MHP mandated Java Media Framework (JMF) APIs. A specially configured application is downloaded to the DSTB and run, the application configuring the paths within the device to provide, inter alia, media access to the on-demand application(s) according to one or more network specific protocols. Accordingly, the network MSO can also uniquely configure the CPE within its network for on-demand capability according to its own specific protocols from the head-end. Improved client device and head-end configurations, as well as methods of operating these systems, are also disclosed.

23 Claims, 6 Drawing Sheets

U.S. PATENT DOCUMENTS

| | | | |
|---|---|---|---|
| 6,941,341 B2 * | 9/2005 | Logston et al. | 709/203 |
| 6,944,185 B2 * | 9/2005 | Patki et al. | 370/474 |
| 7,213,213 B2 * | 5/2007 | Sekiguchi | 715/781 |
| 7,266,726 B1 | 9/2007 | Ladd | |
| 2002/0034193 A1 | 3/2002 | Patki et al. | |
| 2002/0073244 A1 | 6/2002 | Davies et al. | |
| 2003/0037331 A1 | 2/2003 | Lee | |
| 2003/0217365 A1 | 11/2003 | Caputo | |
| 2004/0098730 A1 | 5/2004 | Foote et al. | |
| 2005/0114900 A1 | 5/2005 | Ladd | |

OTHER PUBLICATIONS

Evain J-P: "The Multimedia Home Platform" EBU Review- Technical, European Broadcasting Union. Brussels, BE, No. 275, Mar. 21, 1998, pp. 4-10, XP000767493.

"JMF Registry User's Guide", Sun Microsystems, XP-002573305, Feb. 2, 2001.

"Java Media Framework Player API", Apr. 1997, XP-002093309.

Sun Micro Systems, Inc. Silicon Graphics Inc, Intel Corporation: "Java Media Players, Version 1.0.5", May 5, 1998, X940410443.

* cited by examiner

MEDIA EXTENSION APPARATUS AND METHODS FOR USE IN AN INFORMATION NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of software applications used on an information network (such as a cable television network), and specifically to the accessibility and control of on-demand and related services at certain electronic devices such as, e.g., set-top boxes used in the network during operation of the software.

2. Description of Related Technology

Software applications are well known in the prior art. Such applications may run on literally any type of electronic device, and may be distributed across two or more locations or devices connected by a network. Often, a so-called "client/server" architecture is employed, where one or more portions of applications disposed on client or consumer premises devices (e.g., PCs, PDAs, digital set-top boxes {DSTBs}, hand-held computers, etc.) are operatively coupled and in communication with other (server) portions of the application. Such is the case in the typical hybrid fiber coax (HFC) or satellite content network, wherein consumer premises equipment or CPE (e.g., DSTBs or satellite receivers) utilize the aforementioned "client" portions of applications to communicate with their parent server portions in order to provide downstream and upstream communications and data/content transfer.

Digital TV (DTV) is an emerging technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial. DTV standards such as the OpenCable Application Platform middleware specification (e.g., Version 1.0, and incipient Version 2.0) require that applications be downloaded to CPE from the bearer or broadcast network in real-time. As is well known, the OCAP specification is a middleware software layer specification intended to enable the developers of interactive television services and applications to design such products so that they will run successfully on any cable television system in North America, independent of set-top or television receiver hardware or operating system software choices. OCAP enables manufacturers and retail distributors of set-tops, television receivers or other devices to build and sell devices to consumers that support all services delivered by cable operators.

Multimedia Home Platform (MHP) defines a generic interface between interactive digital applications and the terminals on which those applications execute. This interface decouples different provider's applications from the specific hardware and software details of different MHP terminal implementations. It enables digital content providers to address all types of terminals ranging from low-end to high-end set top boxes, integrated digital TV sets and multimedia PCs. The MHP extends the existing DVB open standards for broadcast and interactive services in all transmission networks including satellite, cable, terrestrial and microwave systems.

Multimedia Home Platform (MHP) Specification 1.0.X contains detailed information on the enhanced broadcasting and interactive profiles, as well as various MHP content formats including PNG, JPEG, MPEG-2 Video/Audio, subtitles and resident and downloadable fonts. MHP 1.0 further provides mandatory transport protocols including DSM-CC object carousel (broadcast) and IP (return channel), DVB-J application model and signaling, hooks for HTML content formats (DVB-HTML application model and signaling), a graphics reference model, and Annexes with DSM-CC object carousel profile, text presentation, minimum platform capabilities, and various APIs. The MHP 1.0 specification provides a set of features and functions required for the enhanced broadcasting and interactive broadcasting profiles. The enhanced broadcasting profile is intended for broadcast (one way) services, while the interactive broadcasting profile supports in addition interactive services and allows MHPs to use the Internet. New profiles will be added later based on the continuing work of the DVB project.

Multimedia Home Platform (MHP) Specification 1.1.X contains further detailing of Interactive and Internet Access Profiles, stored application support, application download via broadcast or interaction channels, DVB-J extensions to better support international applications and smart cards, specification of DVB-HTML, greater support for plug-ins, and support for bi-directional referencing between MHP content and Internet content. MHP 1.1 builds on the MHP 1.0 specification in order to better support the use of the interaction channel and to specify elements which promote interoperability with Internet content.

The Advanced Common Application Platform (ACAP) is a recently developed specification which aims to ensure interoperability between ACAP applications and different implementations of platforms supporting ACAP applications. The architecture and facilities of the ACAP Standard are intended to apply to broadcast systems and receivers for terrestrial (over-the-air) broadcast and cable TV systems. In addition, the same architecture and facilities may be applied to other transport systems (such as satellite).

ACAP is primarily based on GEM and DASE, and includes additional functionality from OCAP. GEM provides a framework for the definition of a GEM Terminal Specification. The ACAP specification builds on GEM by adding specification elements in order to offer a higher degree of interoperability among different environments based on digital TV specifications from ATSC and SCTE.

An ACAP Application is a collection of information which is processed by an application environment in order to interact with an end-user or otherwise alter the state of the application environment. ACAP Applications are classified into two categories depending upon whether the initial application content processed is of a procedural or a declarative nature. These categories of applications are referred to as procedural (ACAP-J) and declarative (ACAP-X) applications, respectively. An example of an ACAP-J application is a Java TV™ Xlet composed of compiled Java™ byte code in conjunction with other multimedia content such as graphics, video, and audio. An example of an ACAP-X application is a multimedia document composed of XHTML markup, style rules, scripts, and embedded graphics, video, and audio.

Application environments are similarly classified into two categories depending upon whether they process procedural or declarative applications. These categories are referred to as ACAP-J and ACAP-X environments, respectively. An example of an ACAP-J environment is a Java Virtual Machine (JVM) and its associated Application Programming Interface (API) implementation. An example of an ACAP-X environment is an XHTML multimedia document browser, also known as a user agent.

In the OCAP, MHP, and ACAP standards, several protocols are defined for accessing broadcast media and files. These generally specify use of the Sun Microsystems Java Media Framework APIs (hereinafter "JMF"). The JMF enables audio, video and other time-based media to be added to applications and applets built on Java technology. This optional package, which can capture, playback, stream, and transcode multiple media formats, extends the Java 2 Platform, Standard Edition (J2SE) for multimedia developers and provides a toolkit to develop scalable, cross-platform technology. The JMF includes a set of components, including the JMF Player API.

With the JMF Player API, programmers can implement support for many audio or video formats by building upon an established media playback framework. In addition, standard implementations provide built-in support for common formats such as muLaw, Apple AIFF, and Microsoft PC WAV for audio, as well as Apple QuickTime video, Microsoft AVI video, and Motion Picture Expert Group's MPEG formats for video. Multimedia playback can also be readily integrated into applets and applications alike with only a limited amount of code.

JMF also allows use of native methods for greater speed, and hence more optimized performance on each platform. At the same time, the common Java Media Player API ensures that applets and standalone applications will run on any Java platform.

A variety of different approaches to implementing media handling and management within networked systems (including use of JMF) are disclosed in the prior art. For example, U.S. Pat. No. 6,092,107 to Eleftheriadis, et al. issued Jul. 18, 2000 and entitled "System and method for interfacing MPEG-coded audiovisual objects permitting adaptive control" discloses a system and method allowing the adaptation of a non-adaptive system for playing/browsing coded audiovisual objects, such as the parametric system of MPEG-4. The system of the invention (programmatic system) incorporates adaptive behavior on top of the parametric system. The parametric system of MPEG-4 consists of a Systems Demultiplex (Demux) overseen by digital media integration framework (DMIF), scene graph and media decoders, buffers, compositer and renderer. The Java Virtual Machine and Java Media Framework (JVM and JMF) are used to various of the aforementioned components. The invention includes a specification of an interfacing method in the form of an application programming interface (API). Hot object, directional, trick mode, transparency and other interfaces are also specified.

U.S. Pat. No. 6,181,713 to Patki, et al. issued Jan. 30, 2001 and entitled "Selectable depacketizer architecture" discloses a scheme that permits the use of a selectable depacketization module to depacketize data streams. An RTP session manager (RTPSM) is responsible for receiving RTP packets from a network and parsing/processing them. A specific depacketizer module is located at runtime depending on the coding decoding scheme ("codec") used to compress the incoming data stream. A naming convention is followed in order for a specific depacketizer to be located. The depacketizer receives data that has already been parsed and is in a readable form. The depacketizer outputs this data using an interface designed such that it is generic across a number of codecs. The interface passes all relevant information to the decoder where the actual depacketized data stream will be decompressed. The RTPSM need not know of any codec details since the depacketizer handles all codec specific issues. A default format is described for data that is output by a depacketizer. This data is provided to a handler that is aware of this format. Pluggable depacketizer naming and searching conventions are designed according to JMF's player factory architecture, and use the same rules for integrating depacketizers into the RTPSM.

U.S. Pat. No. 6,216,152 to Wong, et al. issued Apr. 10, 2001 and entitled "Method and apparatus for providing plug in media decoders" discloses a method and apparatus for providing plug-in media decoders. Embodiments provide a "plug-in" decoder architecture that allows software decoders to be transparently downloaded, along with media data. User applications are able to support new media types as long as the corresponding plug-in decoder is available with the media data. Persistent storage requirements are decreased because the downloaded decoder is transient, existing in application memory for the duration of execution of the user application. The architecture also supports use of plug-in decoders already installed in the user computer. One embodiment is implemented with object-based class files executed in a virtual machine to form a media application. A media data type is determined from incoming media data, and used to generate a class name for a corresponding codec (coder-decoder) object. A class path vector is searched, including the source location of the incoming media data, to determine the location of the codec class file for the given class name. When the desired codec class file is located, the virtual machine's class loader loads the class file for integration into the media application. If the codec class file is located across the network at the source location of the media data, the class loader downloads the codec class file from the network. Once the class file is loaded into the virtual machine, an instance of the codec class is created within the media application to decode/decompress the media data as appropriate for the media data type.

U.S. Pat. No. 6,631,350 Celi, Jr., et al. issued Oct. 7, 2003 and entitled "Device-independent speech audio system for linking a speech driven application to specific audio input and output devices" discloses a device-independent speech audio system for linking a speech driven application to specific audio input and output devices can include a media framework for transporting digitized speech audio between speech driven applications and a plurality of audio input and output devices. The media framework can include selectable device-dependent parameters which can enable the transportation of the digitized speech to and from the plurality of audio input and output devices. The device-independent speech audio system also can include an audio abstractor configurable to provide specific ones of the selectable device-dependent parameters according to the specific audio input and output devices. Hence, the audio abstractor can provide a device-independent interface to the speech driven application for linking the speech driven application to the specific audio input and output devices.

U.S. Pat. No. 6,631,403 to Deutsch, et al. issued Oct. 7, 2003 and entitled "Architecture and application programming interfaces for Java-enabled MPEG-4 (MPEG-J) systems" discloses an MPEG-J collection of Java application programming interfaces (APIs) with which applications can be developed to interact with the platform and the content. In the context of MPEG-J, the platform is a device like a set-top box or a PC with Java packages conforming to a well-defined Java platform. The Java-based application consists of Java byte code, which may be available from a local source, like a hard disk, or it may be loaded from a remote site over a network. The MPEG-J Java byte code may be available as a separate elementary stream. The MPEG-4 system is the "Presentation engine" of MPEG-J. MPEG-J provides programmatic control through an "Application engine" which enhances the MPEG-4 browser by providing added interactive capability.

U.S. Pat. No. 6,654,722 to Aldous, et al. issued Nov. 25, 2003 and entitled "Voice over IP protocol based speech system" discloses a VoIP-enabled speech server including a JMF interface and speech application which can be configured to communicate with a VoIP telephony gateway server over a VoIP communications path. In operation, the speech application can receive VoIP-compliant packets from the VoIP telephony gateway server over the VoIP communications path. Subsequently, digitized audio data can be reconstructed from the VoIP-compliant packets, and the digitized audio data can be speech-to-text converted. Additionally, text can be synthesized into digitized audio data and the digitized audio data can be encapsulated in VoIP-compliant packets which can be transmitted over the VoIP communications path to the telephony gateway server. The JMF media interface is used to establish a data path for transporting the digital audio data between the speech application and the voice call connection.

U.S. Patent Application Publication 20020073244 to Davies, et al. published Jun. 13, 2002 entitled "Method and an apparatus for the integration of IP devices into a HAVi network" discloses a method and apparatus for integrating IP devices into a HAVi network. An Internet Protocol (IP) and HAVi compliant device acts as a controller in the HAVi network and communicates with at least one HAVi compliant device using HAVi application programming interfaces (APIs). A server on the controller communicates with at least one IP device having a proxy and an IP and HAVi API. The server includes at least one IP device control module (IP device DCM) corresponding to the IP device. The IP device providing API support to translate and relay calls between the proxy and the server so that at least one HAVi compliant device can communicate with the IP device. In one embodiment, JMF and C++ graphic libraries are used in conjunction with a streaming module to get the stream data and display the stream data.

U.S. Patent Application Publication 20030037331 to Lee published Feb. 20, 2003 and entitled "System and Method for Highly Scalable Video on Demand" discloses a system and method for providing video on demand including pre-scheduled multicasts of videos as well as dynamically initiated transmissions of the front portion of videos. Users may first receive a dynamically initiated front portion of a video and then be merged into a pre-scheduled multicast. The dynamically initiated transmission is also a multicast. Multiple admission controllers and a single server coordinate the dynamically initiated transmissions for any one video. Preferably, interactive controls are supported without requiring extra server-side resources, and latency is automatically equalized between users admitted via the pre-scheduled and the dynamically initiated transmissions. A user receiving a video via a pre-scheduled multicast does not need to change channels to finish receiving the video transmitted. Client applications implemented using the Java programming language and the Java Media Framework (JMF) are also disclosed.

In the aforementioned OCAP, MHP and ACAP standards, several protocols are defined for accessing broadcast media and files. These protocols are indicated in string form, and are encapsulated in the standards using a Locator object that contains the protocol and any other terms necessary to identify a service and its elements. In each standard, the protocols must be supported by JMF. The JMF MediaHandler understands the content format of the media associated with a protocol string, and the JMF DataSource understands the actual messaging and packet protocol associated with a protocol string.

OCAP, for example, allows an application to extend the given protocols in an application-specific fashion. This is performed by calling the JMF PackageManager "set-prefix" methods. Setting the prefixes to provide an extended protocol is defined by JMF, which allows changes made by the "set" methods to be made persistent by providing commit-prefix methods.

However, neither OCAP nor the other prior art approaches described above allow an application to call these commit-prefix methods and make them persistent. This means when more than one application needs to add the same protocol, each application must perform a redundant set prefix process, or communicate with an application that has set the prefixes using Inter-Xlet communications (IXC), as defined by MHP 1.0.2 and complied with in OCAP 1.0.

Accordingly, there is a need for improved apparatus and methods for providing network-specific services in a standards compliant fashion. Such improved apparatus and methods would ideally utilize existing media handling infrastructure (e.g., the JMF APIs or comparable) to enables a network specific protocol for handling various services within the device, such as video on-demand (VOD). Such improved apparatus and methods would also ideally permit an MSO or other entity to add the network-specific protocols to the device such that comparable services (e.g., VOD) could operate on CPE within a number of heterogeneous networks.

SUMMARY OF THE INVENTION

The present invention addresses the foregoing needs by disclosing an improved on-demand apparatus and associated methods.

In a first aspect of the invention, an improved method of operating client equipment in a content-based network is disclosed. The method generally comprises: receiving at the client equipment an application configured to implement a network-specific protocol; storing the application within a storage device of the client equipment; running the application to configure the equipment according to the network-specific protocol; and operating the CPE and the application to provide on-demand services to a user. In one exemplary embodiment, the client equipment comprises CPE within an HFC cable network compliant with the OCAP, ACAP, and/or MHP standards and running Java middleware. The downloaded application is configured to define one or more protocol-specific locators within the CPE which provide persistent access to the various media interfaces (e.g., JMF) by one or more on-demand applications resident on the CPE.

In a second aspect of the invention, an improved method of operating client equipment adaptable for use in any one of a plurality of different content-based networks within a particular content-based network is disclosed. The method generally comprises: receiving at the equipment an application configured with a protocol extension, the protocol extension being adapted for use in the particular network within which the client equipment operates; running the application to configure the equipment according to the protocol; and selectively allowing at least one application resident on the equipment to access the extension, the at least one application having attributes specific to the particular network. In the exemplary embodiment, the CPE comprises an OCAP, ACAP, and/or MHP compliant DSTB which can operate in any number of different MSO networks. The present invention permits this "universal" CPE to be configured by a particular MSO or other entity when the CPE is used in their network, such configuration including installation of network- or MSO-specific protocols which support on-demand services.

In a third aspect of the invention, an improved method of developing the specific protocol useful for delivery of content from a first node of a network to a second node thereof. The method generally comprises: developing a first component adapted to communicate between the first and second nodes; developing a second component adapted to process the content delivered to the second node; and developing a third component adapted to cooperate with at least one of the first and second components to control functions specific to the protocol. In one exemplary embodiment, the first component comprises a Java DataSource, the second a Java MediaHandler/Player, and the third a control adapted to control functionality associated with an on-demand application (e.g., play, rewind, pause, etc. for a VOD application). The OD application accesses these components via a network-specific protocol.

Similarly, in a fourth aspect of the invention, improved CPE adapted for operation within a content-based network, the CPE comprising a software application adapted for providing on-demand services to a user using a network-specific protocol, is disclosed. The application generally comprises: a first software component adapted to communicate between the CPE and another entity of the network; a second software component adapted to process the content delivered to the CPE; and a third software component adapted to cooperate with at least one of the first and second components to control functions specific to the protocol.

In a fifth aspect of the invention, an improved method of implementing a network-specific on-demand application within the CPE of the network is disclosed. The method generally comprises: developing a plurality of media interface components adapted to implement a network-specific protocol; disposing the plurality of components within a software application to produce a configured application; running the configured application on the CPE; and defining at least one path to the media interface components, the at least one path and media interface components cooperating to provide network specific on-demand services.

In a sixth aspect of the invention, an improved apparatus adapted for operation within a multi-channel HFC cable distribution network is disclosed. In one exemplary embodiment, the apparatus comprises a DSTB (or TV with integrated DSTB hardware) having: a digital processor; a mass storage device operatively coupled to the processor; OCAP-compliant middleware adapted to run on the processor; and at least one software application adapted to run on the processor, the at least one application having a plurality of developed components within its application directory hierarchy; wherein the DSTB is further configured to run the application and configure at least one path to at least one of the developed components. This path is then utilized by one or more on-demand applications to access and provide services.

In a seventh aspect of the invention, a method of utilizing CPE compatible for use on a variety of different cable networks within any given one of the networks is disclosed. The method generally comprises: disposing the CPE within the given one network to be in operative communication with another network entity; transferring a software application onto the device from the network entity, the software application being configured to implement a network-specific protocol, the network-specific protocol implementing one or more network-specific on-demand services; and running the at least one software application on the device, the running configuring at least one path within the CPE to permit access of the network-specific on-demand services by a user.

In an eighth aspect of the invention, an improved head-end apparatus adapted for providing a network-specific on-demand application to CPE of the network is disclosed. The apparatus generally comprises: at least one computer in communication with the network, and at least one computer program adapted to develop a specific protocol useful in implementing the on-demand application according to the method comprising: developing a first component adapted to communicate between the head-end and the CPE; developing a second component adapted to process the content delivered to the CPE; and developing a third component adapted to cooperate with at least one of the first and second components to control functions specific to the on-demand application.

These and other aspects of the invention shall become apparent when considered in light of the disclosure provided below.

DETAILED DESCRIPTION OF THE INVENTION

Figure 1:
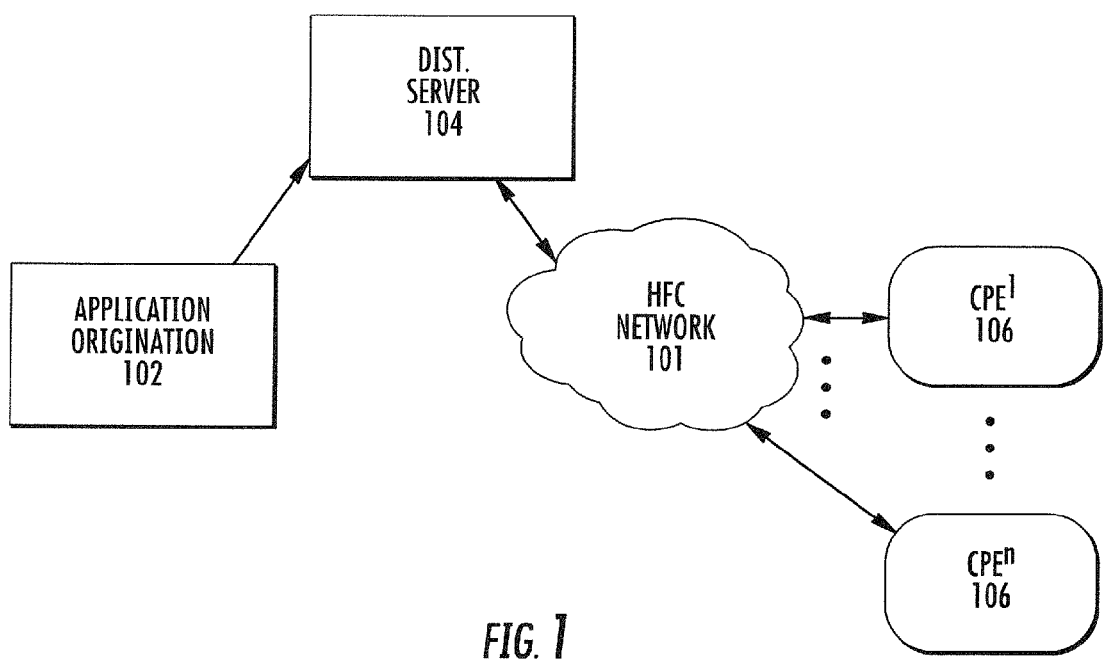
FIG. 1 is a functional block diagram illustrating an exemplary HFC network configuration useful with the present invention.

Reference is now made to the drawings wherein like numerals refer to like parts throughout.

As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like.

As used herein, the term "middleware" refers to software that generally runs primarily at an intermediate layer in a software or protocol stack. For example, middleware may run on top of an operating system and platform hardware, and below applications.

The term "component" refers generally to a unit or portion of executable software that is based on a related set of functionalities. For example, a component could be a single class in Java™ or C++. Similarly, the term "module" refers generally to a loosely coupled yet functionally related set of components.

As used herein, the term "process" refers to executable software that runs within its own CPU environment. This means that the process is scheduled to run based on a time schedule or system event. It will have its own Process Control Block (PCB) that describes it. The PCB will include items such as the call stack location, code location, scheduling priority, etc. The terms "task" and "process" are typically interchangeable with regard to computer programs.

A server process is an executable software process that serves various resources and information to other processes (clients) that request them. The server may send resources to a client unsolicited if the client has previously registered for them, or as the application author dictates.

As used herein, the term "DTV Network Provider" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", Dell Axim X3/X5, personal communicators such as the Motorola Accompli devices, Motorola EVR-8401, J2ME equipped devices, cellular telephones, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "on-demand" refers to any service or condition invoked or initiated, either directly or indirectly, by a user, customer, individual, or entity (or their proxy), and includes without limitation VOD (video on demand), near-VOD or NVOD (i.e., where a request incurs a delay at the server or other entity prior to commencement of service, including so called "staggered multicast"), MOD (movies on-demand), NPVR (network personal video recorder), and COD (commerce on-demand).

As used herein, the term "user interface" or UI refers to any human-system interface adapted to permit one- or multi-way interactivity between one or more users and the system. User interfaces include, without limitation, graphical UI, speech or audio UI, tactile UI, and even virtual UI (e.g., virtual reality).

Overview

The present invention discloses, inter alia, a mechanism for implementing enhanced session and data/media stream management using pre-existing protocols. In the exemplary embodiment, the invention is utilized in the context of on-demand (OD) services provided over a content-based network such as an HFC terrestrial cable system. Such networks have a plurality of consumer premises devices (CPE) or other such devices in data communication with the network; the interaction of these devices with various types of OD services is governed by standards that contain software reference frameworks (including APIs) for media handling. One such software framework comprises the well known Sun Microsystems Java media framework API (JMF), which is specified in most major cable media-related middleware standards including the Multi-media Home Platform (MHP) standard, the OpenCable application platform (OCAP) standard, and the Advanced Common Application Platform (ACAP) application programming interfaces (APIs).

The present invention advantageously extends the functionality of these media frameworks (e.g., JMF) over the baseline functionality called for in the standards, and further enables a network specific protocol for handling services such as on-demand (OD) in a standards-compliant and seamless fashion. The protocols provided by the present invention allow applications operating within the CPE's software environment to access the extension, a capability not present in the prior art. Furthermore, each of these protocols can be added to the CPE by a network-specific application using JMF.

Moreover, MSO or network-specific protocols can readily be added to the same or different CPE in order to facilitate use of e.g., OD services across multiple different networks.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

FIG. 1 illustrates a typical network component configuration with which the application media extension apparatus and methods of the present invention may be used. The various components of the network 100 include (i) one or more application origination points 102; (ii) one or more distribution servers 104; and (iii) consumer premises equipment (CPE) 106. The distribution server(s) 104 and CPE(s) 106 are connected via a bearer (e.g., HFC) network 101. A simple architecture comprising one of each of the aforementioned components 102, 104, 106 is shown in FIG. 1 for simplicity, although it will be recognized that comparable architectures with multiple origination points, distribution servers, and/or CPE devices (as well as different network topologies) may be utilized consistent with the invention. For example, the head-end architecture of FIG. 1*a* (described in greater detail below) may be used.

The application origination point 102 comprises any medium that allows an application to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The distribution server 104 comprises a computer system where one or more applications can enter the network system. Distribution servers are well known in the networking arts, and accordingly not described further herein.

The CPE 106 includes any equipment in the "consumers' premises" (or other locations, whether local or remote to the distribution server 104) that can be accessed by a distribution server 104. Such CPEs 106 comprise processors and associated computer memory adapted to store and run the downloaded or resident application. In the present context, at least a portion of the application is typically downloaded to the CPE 106, wherein the latter executes the downloaded application(s)/components, although it will be recognized that all of applications may conceivably be uploaded to the server, or alternatively transferred to another device, such as other networked CPE or the like. Applications may be (i) "pushed" to the CPE (i.e., wherein the distribution server causes the application download to occur), (ii) "pulled" to the CPE (i.e., where the CPE causes the download), (iii) downloaded as the result of some third entity or device (such as a remote server); (iv) resident on the CPE at startup; or (v) combinations of the foregoing.

Figure 1A:
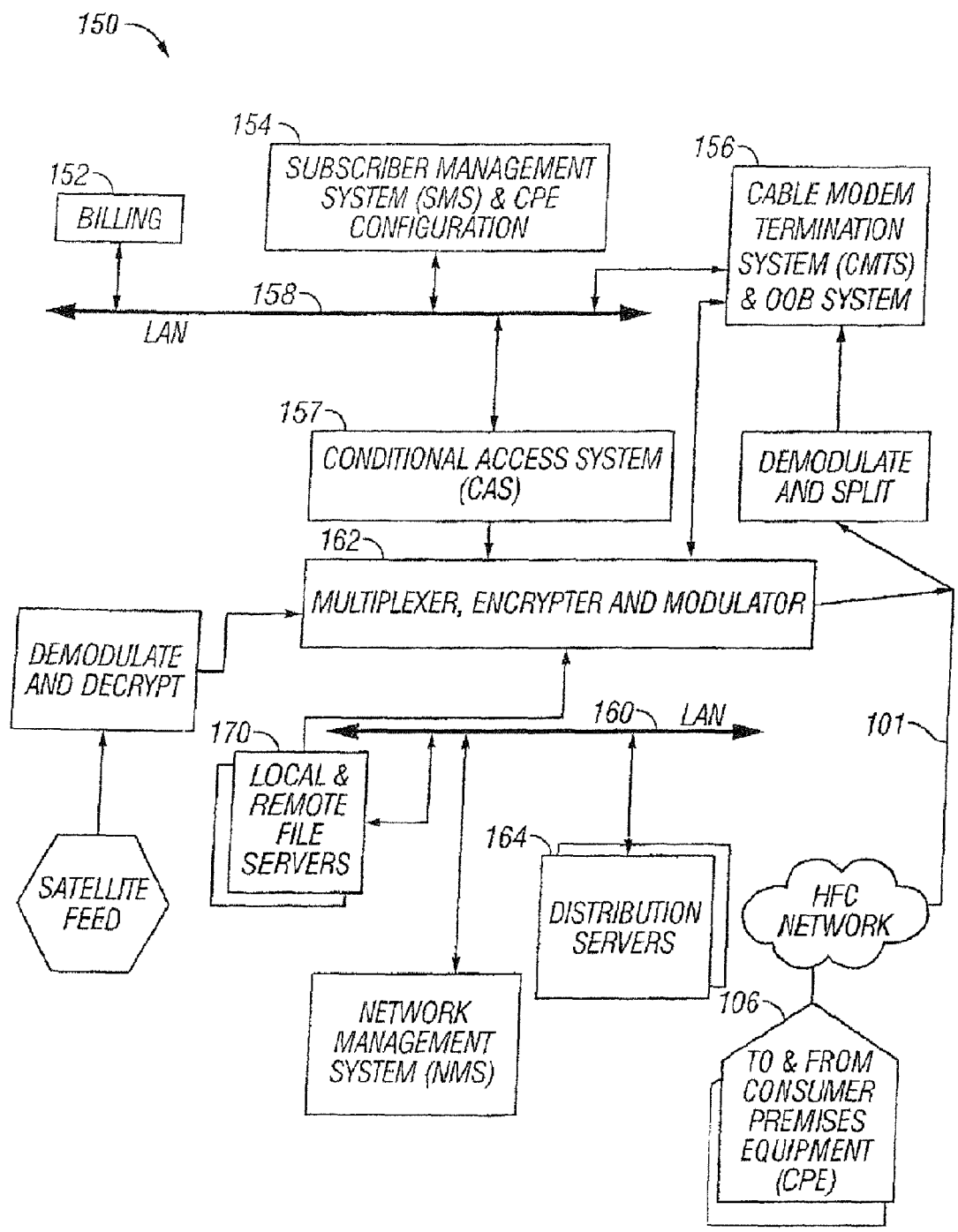
FIG. 1a is a functional block diagram illustrating one exemplary head-end configuration of an HFC network useful with the present invention.

Referring now to FIG. 1*a*, one exemplary embodiment of the network head-end architecture useful with the invention is described. As shown in FIG. 1*a*, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1*a* is high-level, conceptual architecture and that each MSO may have multiple head-ends deployed using custom architectures.

The architecture 150 of FIG. 1*a* further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. In the typical HFC network, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel. To communicate with the head-end, the CPE 106 uses the out-of-band (OOB) DAVIC or DOCSIS channels and associated protocols. The OCAP 1.0 specification provides for networking protocols both downstream and upstream. To distribute files and applications to the CPE 106, the files and applications are configured as data and object carousels and may be sent in both the in-band and OOB channels. As is well known in the art, a carousel may be viewed as a directory containing files. The files of the carousel utilized herein are sent in a continuous round-robin fashion. If the client device misses a desired or necessary file in one carousel transmission, it can wait for the next. Alternatively, in another embodiment, the CPE portion of the application is configured as part of the program content on a given in-band or DOCSIS channel. As yet another embodiment, the CPE portion is downloaded directly using IP (Internet Protocol) packet traffic in an Out-Of-Band channel. Note that the file carousel or other device providing the application to the CPE 106 via the aforementioned communication channels may be the distribution server 104 previously described, or alternatively a separate device which may or may not be physically co-located with the server (e.g., remote file servers 170 of FIG. 1a). For example, a remote file storage device (not shown) with carousel capability may be in data communication with the client device(s) via an out-of-band communications channel as described below, the download of the application files from the remote device being initiated by way of a query from the client device, or alternatively a signal generated by the server 104 and transmitted to the remote device. Many other permutations of the foregoing system components and communication methods may also be used consistent with the present invention, as will be recognized by those of ordinary skill in the field.

Figure 2:
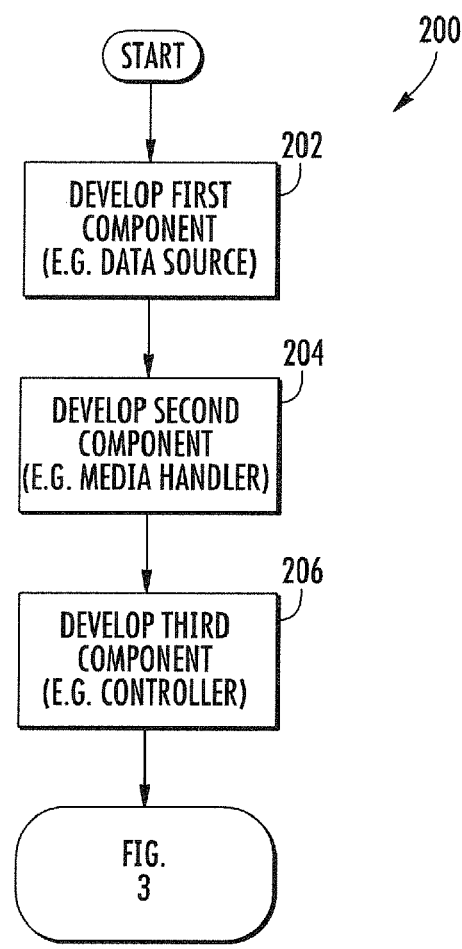
FIG. 2 is a logical flow diagram illustrating an exemplary method for developing a network-specific protocol according to the invention.
Figure 3:
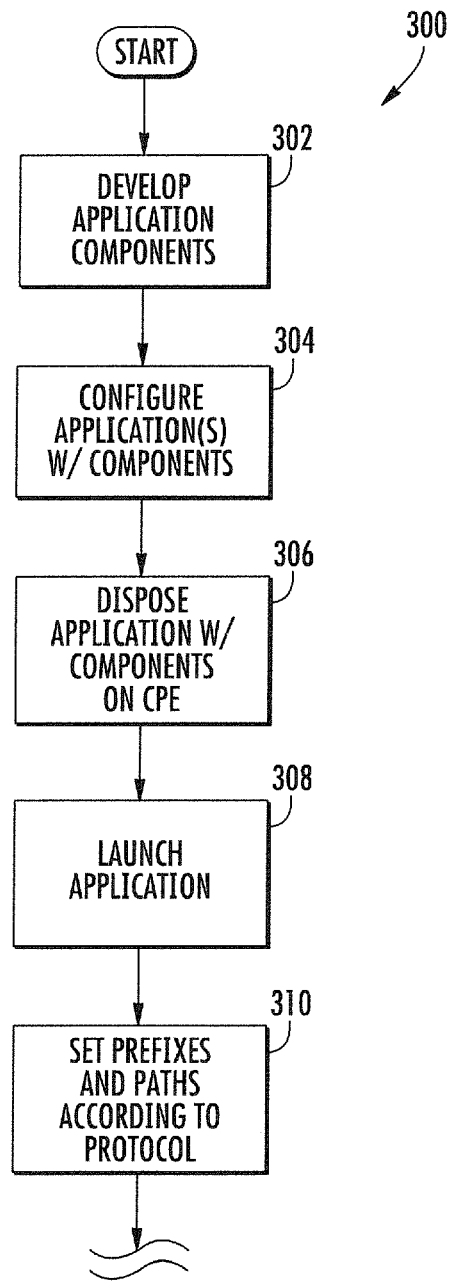
FIG. 3 is a logical flow diagram illustrating an exemplary embodiment of the method of implementing the network specific protocol components developed under the method of FIG. 2.

Referring now to FIGS. 2-3, exemplary methods for extending media frameworks within a network according to the present invention are now described in detail. It will be recognized that while the following embodiments are cast in terms of the exemplary MSO-based HFC network 100 of FIG. 1, including CPE compliant with one or more of the aforementioned MHP, OCAP, and ACAP standards (including Java-based object-oriented programming environment and associated JMF), the invention may be applied to other types of APIs, software environments (including, without limitation C, C++, and Ada), and middleware environments (e.g., MHEG,), thereby providing significant flexibility.

In the exemplary MHP, OCAP, and ACAP standards, several protocols are defined for accessing broadcast media and files. These protocols are typically indicated in a known format (e.g., string form). Using the OCAP standard as an example, the protocol set includes: (i) "ocap://" for accessing streaming broadcast media; (ii) "file://" for accessing files in a carousel or that have been cached in consumer premises equipment (CPE), and (iii) "dripfeed:" for accessing a slow feed of MPEG images that produce a slideshow effect. Other standards have comparable sets of protocols; e.g., "dvb://" in MHP and "acap://" in ACAP for accessing streaming media broadcasts.

The foregoing protocols are encapsulated in the Standards using a Locator object that contains the protocol, and any other terms necessary to identify a service and its elements. For example, a source name could be used with a given protocol in order to locate a specific service in a broadcast, as in:

"ocap://NBC"

Where "ocap://" is the protocol, and "NBC" is the media or data source name. Each of the foregoing standards has a standard specific Backus-Naur form (BNF) for defining supported Locator forms and terms, although such BNF form is not required to practice the present invention. The generalized meta-symbols of an exemplary BNF are:

| | ::= |
|---|---|
| meaning "is defined as"; | |
| | \| |
| meaning "or"; and | |
| | <> |

(angle brackets) used to surround category names. The angle brackets distinguish syntax rules names (also called "nonterminal" symbols since they are replaced in the production by a sequence of other symbols) from terminal symbols which are written exactly as they are to be represented. A BNF rule defining a nonterminal has the form:

> nonterminal ::= sequence_of_alternatives consisting of strings of terminals or nonterminals separated by the meta-symbol |

For example, the BNF production for a mini-language is:

> \<program\> ::= program
> \<declaration_sequence\>
> begin
> \<statements_sequence\>
> end ;

This example shows that a mini-language program consists of the keyword "program" followed by the declaration sequence, then the keyword "begin" and the statements sequence, finally the keyword "end" and a semicolon. Other types of BNF formats (extended or otherwise) may be used consistent with the invention, the foregoing being merely illustrative in nature.

In the exemplary embodiment, the protocols must be supported by the media framework API (e.g., JMF) in each relevant standard. As previously described, the exemplary JMF API(s) utilized within the OCAP, MHP and ACAP standards enables audio, video and other time-based media to be added to applications and applets built on Java technology. This package can capture, playback, stream, and transcode multiple media formats, and extends the Java 2 Platform, Standard Edition (J2SE) for multimedia developers by providing a toolkit to develop scalable, cross-platform technology.

It will be appreciated, however, that the present invention is in no way limited to the standardized JMF APIs. For example, the interface(s) provided with the trusted application(s) described herein may be customized to the particular application or CPE to which it will be distributed (in addition to the extension protocols). Combinations of standardized and non-standardized/customized APIs may be utilized as well in order to differentiate various services or features within the CPE or network.

In the particular case of JMF, the JMF MediaHandler understands the content format of the media associated with a protocol string and the DataSource understands the actual messaging and packet protocol associated with a protocol string. MediaHandler is the base interface for objects that read and manage media content delivered from a DataSource. There are typically three (3) supported types of MediaHandler/code>: (i) Player, (ii) MediaProxy and (iii) DataSink. "SetSource" (DataSource source) sets the media source the MediaHandler should use to obtain content.

OCAP allows an application to extend the given protocols in an application specific fashion. This is accomplished by calling the JMF PackageManager set prefix methods. As in known to those of ordinary skill, a PackageManager maintains a persistent store of package-prefix lists. A package prefix specifies the prefix for a complete class name. A factory uses a package-prefix list to find a class that might belong to any of the packages that are referenced in the prefix list. The Manager uses package-prefix lists to find protocol handlers and content handlers for time-based media.

The current version of a package-prefix list is obtained with the get<package-prefix>List method. This method returns the prefix list in use; any changes to the list take effect immediately. Unless it is made persistent with commit<package-prefix>List, a package-prefix list is only valid while the Manager is referenced. The commit<package-prefix>List method ensures that any changes made to a package-prefix list are still visible the next time that the Manager is referenced.

Hence, providing an extended protocol by setting the prefixes is defined by JMF. JMF allows changes made by the set methods to be made persistent by providing commit prefix methods. However, OCAP does not allow an application to call the commit prefix methods, only the set prefix methods. Setting new prefixes adds DataSource/MediaHandler pairs to the system.

As previously described, the exemplary configuration of the present invention discloses a specific extension allowable by the relevant standards, as well as changes to these standards to allow the (JMF) extensions to be made persistent (i.e., accessible) to all applications running on the CPE 106 or other client device. These JMF extensions specify one or more "anything on-demand" protocols. Various services including, without limitation, video on-demand (VOD), movies on-demand (MOD), near video on-demand (NVOD), and network personal video recorder (NPVR) are provided using multiple protocols. Each of these particular protocols can be added to the CPE 106 by a network-specific application using the JMF.

An exemplary on-demand environment useful with the present invention comprises the Time Warner Cable iCONTROL system, which lets users choose from a variety of different input sources through the user's digital set-top box. The Time Warner system gives the user the ability to pause, fast forward, and rewind the content. The user pays only for the programs ordered. The user's remote control is used to choose the program from a selection listed on screen menus. Movies, sports, specials, original series, and music videos are available for viewing. In the exemplary iCONTROL system, the user has unlimited access to the selected content for a period of 24 hours after initiation.

Moreover, a service such as VOD will typically be implemented using one or more protocols in a first MSO's network, and one or more different protocols in a second MSO's network. The technique of the present invention allows services of the same type (e.g., a particular instance of a VOD application, all VOD applications generally, or even all OD applications generally) that are implemented using different protocols to be added to CPE in various different networks having different MSOs.

FIG. 2 illustrates an exemplary method for developing a network-specific protocol according to the invention. As previously described, the exemplary JMF protocol extension capability provides a mechanism whereby an MSO or other application downloaded to the CPE 106 can install a protocol specific to the particular network in which it operates, and that will run in a standards-compliant environment (see discussion of FIG. 3 below).

As shown in FIG. 2, the method 200 of developing the specific protocol(s) (e.g., "xod://") comprises first developing a DataSource (step 202). The defined DataSource implements the protocol to communicate between a head-end 150 or other network agent and the CPE 106. It also implements the protocol(s) to, inter alia: (i) setup a session, (ii) handshake or negotiate conditional access parameters, (iii) specify the content or data channel that the on-demand (OD) event will be sent to, and (iv) handle messaging for "trick" or other associated functional modes (e.g., play, pause, rewind, fast-forward).

Next, per step 204, a MediaHandler is developed for the content format delivered by the network-specific protocol. The MediaHandler may use another MediaHandler specified by OCAP, ACAP, or MHP if the content format is already supported (e.g., MPEG-2). As will be recognized by those of ordinary skill in the programming arts, the MediaHandler developed per step 204 comprises a framework (interface) which supports a developed "Player" as previously described herein; the Player implements MediaHandler.

Per step 206, a controller is developed that can be attached to the developed Player. The controller is used for, e.g., special controls of functions that are specific to the protocol, such "trick" modes. This approach allows the user to access controls of the playback using a GUI or other UI that has access to the controller. The controller in turn will access the DataSource to cause the appropriate messages to be sent, and the corresponding functions to be executed.

In one exemplary embodiment, an application developer will create an application required by an MSO and containing the aforementioned JMF components to allow a network-specific protocol to be supported in CPE (e.g., retail) devices. The MSO places the application in a multiplex transport stream delivered to CPE. An OCAP implementation will then download the JMF-equipped application and launch it if signaling (i.e. SI tables) from the head end so dictate. When the application is launched, it sets and commits the prefixes, thereby subsequently allowing any application within the device to use them.

Referring now to FIG. 3, an exemplary embodiment of the method of implementing the network specific protocol components developed under the method 200 of FIG. 2 is described. As shown in FIG. 3, once the JMF components are developed under that method 200 (step 302), they are placed inside of one or more applications that are configured to use the components (step 304). Specifically, the target application(s) are configured to contain the developed classes and interfaces within their application directory hierarchy. This may include files or other components in addition to the aforementioned items that are used to support the JMF components. For example, a DataSource may use a plurality of classes to implement a protocol.

It will be recognized that the development processes (method 200 of FIG. 2) and the assembly or configuration of the target application(s) therefrom (step 304 of FIG. 3) can be performed contemporaneously by the same or different entity, or alternatively non-contemporaneously by the same or different entity. For example in one embodiment, the network-specific protocol components are developed and assembled into the application contemporaneously via one application authoring entity.

In another embodiment, sets of network specific protocol components are developed, each set being adapted to, e.g., a different MSO environment. In response to a request for the application within a given MSO network, such as from the head-end 150, a network agent, or even the CPE 106, the application authoring entity assembles the requested application(s) from the relevant protocol component set according to the individual network parameters, and then delivers it directly (or latently) to the requesting entity.

In yet another embodiment, the CPE 106 itself can be used to assemble the network-specific protocol ("extended") application(s). For example, the CPE may be provided with the aforementioned set(s) of MSO-specific components in advance (such as via download or at time of manufacture/installation), and an editor application which uses the appropriate component set in conjunction with a downloaded "generic" application blank to develop the requested application effectively on-demand (or near-OD).

Figure 5:
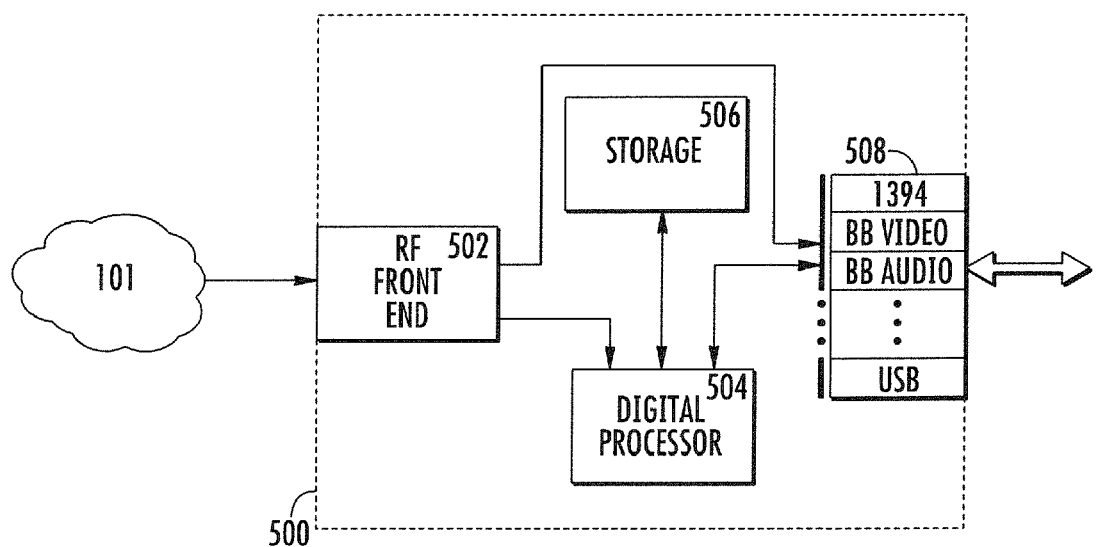
FIG. 5 is block diagram of a first embodiment of an improved electronic device (e.g., CPE) with extended protocol capability according to the present invention.

Next, the configured application(s) is/are disposed on any CPE 106 or other network device that meets the requirements of one of the relevant standards (step 306). Such CPE may comprise, e.g., an OCAP and MHP-capable DSTB (FIG. 5). The configured application(s) may be downloaded from the head-end 150, a network agent or other designated source, third party provider, or even provided via a data interface at the CPE 106 (such as a WiFi interface, IEEE-1394 port, or even a mass storage device such as a HDD, CD-ROM, flash cartridge, or USB Key). As yet another alternative, purchased or leased CPE can be pre-configured with the applications at time of sale or installation, including where the CPE as sold or leased includes a suite of pre-configured OD applications each adapted for a different MSO environment (e.g., a first version of an OD-based application configured for use on Time Warner Cable networks, a second version configured for use on Cox Cable networks, etc.).

Once resident on the CPE or target device, the network-specific application is launched (step 308) either immediately or with some degree of latency. Launching the application may be made automatic, conditional upon some prerequisite or instigating event (such as the user selecting the application), or otherwise. When the application is launched, it sets the prefixes (i.e., paths to the DataSource and MediaHandler) using the JMF PackageManager set prefix methods previously described herein (step 310). In the exemplary configuration, the prefixes are network specific, so they are set by a network application. Alternatively, however, it will be recognized that other approaches may be used, such as where the CPE manufacturer has an existing arrangement with the MSO, and the prefixes are set in advance, such as at the time of manufacture or installation.

Advantageously, whenever the application uses a Locator with the new protocol string in a method call (such as during use by the consumer during a VOD or similar session), the JMF will associate the Locator with the correct DataSource/MediaHandler pair.

Thus, by implementing the aforementioned methods, a first network's OD service can be implemented using a first protocol, and a second network's OD service can be implemented using a second protocol, but both can be implemented in CPE in a standards compliant fashion. It will be recognized that both (i) one CPE with multiple network protocol capability, and (ii) a plurality of CPE each with only one network protocol, can be implemented. For example, where a user has more than one MSO environment available to them, one CPE can have MSO-specific variants of the OD application for use with each different network. Alternatively, and more commonly, each CPE has access only to one MSO, and hence only requires one network-specific protocol.

However, regardless of form, the present invention notably provides, inter alia, the ability for a standards-compliant CPE to download (or self-assemble) a tailored network-specific OD application which has access to the JMF or other extension associated with the relevant standard(s).

One significant shortcoming of the prior art definition of JMF extensions provided by the relevant standards such as OCAP, MHP and ACAP is that the definition can only be applied to the application that sets the prefixes (FIG. 4a) Accordingly, in another aspect of the invention, a method (including optionally a change or modification to the relevant standards) is disclosed which allows this definition to be extended to any application with appropriate permission.

In the aforementioned standards, each application runs in its own physical or logical Java virtual machine (JVM). This creates so-called "walled gardens" around the applications, and prevents them from accessing classes that are not part of their class hierarchy or the system class hierarchy (i.e., they can't access classes specific to other applications). This approach prevents many security issues. However, it would be desirable to make a network extended protocol available to all network applications that are properly configured to make use of extension without significantly impairing security. For example; if an electronic program guide (EPG) and a music video (MV) application that need to use the same extended protocol, then rules would need to be enforced regarding their use. For example, the EPG and MV would both have to be downloaded with all the protocol class files in a redundant fashion, or they both have to be put into a single application in the current standards definition, or one application would have to register objects with the OCAP implementation using IXC, so that other applications could get to the network specific protocol handlers. However, IXC objects registered would have to provide a wrapper around JMF calls and are thus redundant.

Figure 4B:
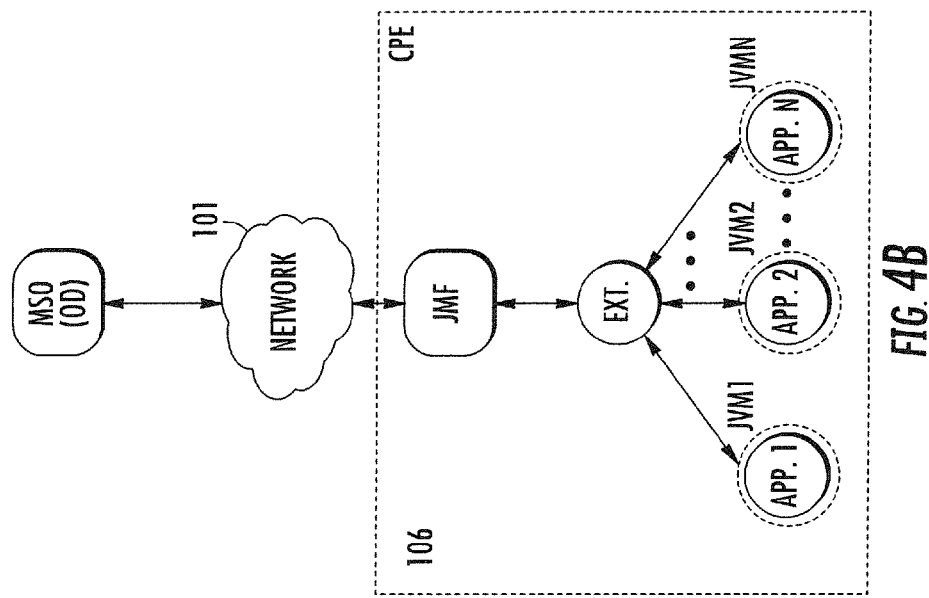
FIG. 4b is a graphical representation of an exemplary definition of JMF extensions according to the present invention, illustrating definitions which can be applied to any number of applications of the CPE, whether they set the prefixes or not.
Figure 4A:
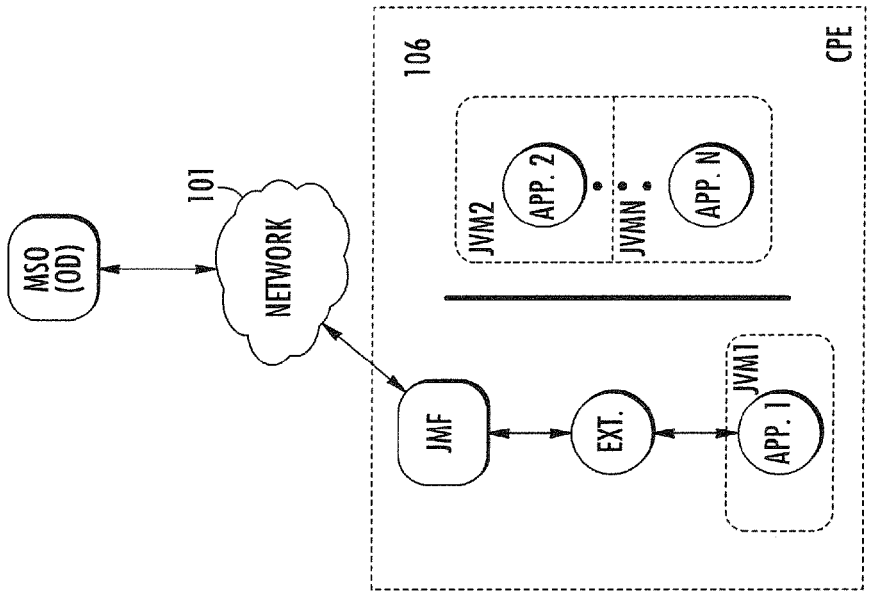
FIG. 4a is a graphical representation of the prior art definition of JMF extensions for CPE provided by the relevant standards such as OCAP, MHP and ACAP, illustrating definitions which can only be applied to the application that sets the prefixes.

In one exemplary embodiment, the present invention allows an application with a special network permission (which may be established from the head end 150, authoring entity, or even the CPE 106), to call the JMF commit prefixes methods previously described herein. By JMF definition, this makes persistent the changes caused by the set prefixes methods, thereby making the extension available to applications running on the CPE (FIG. 4b).

However, with each application is running in its own JVM, all class files found in the calling application's directories indicated by the set prefixes method calls are also placed into the system class file space when the JMF commit prefixes methods are called. To support this functionality, additional statements are added to include the paths of the class files indicated by the new prefixes into the system classpath.

The foregoing modifications can cause perceived security issues. When network specific protocol handling is exposed to all applications, a malicious application could use the protocol to damage the protocol in general. For example, a malicious application might try to flood the network with messages using an MSO provided protocol. However, the aforementioned standards currently include application signing requirements, and class loader and RuntimePermission restrictions that alleviate most security concerns of these issues. Other issues are alleviated in the present embodiment by adding one or more stipulations that require that any application using an extended protocol of the type described herein must have the same permission required to commit the prefixes for that protocol. Hence, a level of parity between the committing and using applications is established, thereby preventing applications that don't have appropriate permission from calling the extended protocol.

Optionally, yet other stipulations may be added, such as requiring that any application using an extended protocol must be signed with a certificate belonging to the MSO owning the network to which the CPE 106 is currently connected. In the exemplary context of OCAP, the standard (OCAP 1.0)

specifies that applications are Java-based, and uses the Java-based permission scheme to provide various capabilities to applications in the network. Signed (trusted) applications are capable of receiving permissions in addition to those available to unsigned applications. Particularly, an MSO or other entity can selectively assign application permissions to trusted applications of their choice. In the present case, these permissions would include a signed certificate from the MSO. The "using" application would need to have such a signed certificate from, e.g., Time Warner Cable (TWC) for that application to be able to access the extended protocol applicable to TWC networks, thereby frustrating unsigned/unauthorized or cross-network applications from gaining access.

Accordingly, using the present invention, a network operator can commit classes in CPE that can be used by any of their applications to implement MSO provided services in a standards-compliant fashion. This provides significant flexibility to the MSO, as well as increasing user satisfaction from an increasingly seamless access and utilization of OD or other applications running on their individual CPE.

Referring now to FIG. 5, a first embodiment of the improved electronic device with extended protocol capability according to the present invention is described. As shown in FIG. 5, the device 500 generally comprises and OpenCable-compliant embedded CPE 106 having an RF front end 502 (including modulator/demodulator) for interface with the HFC network 101 of FIG. 1, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) include RF tuner stages, various processing layers (e.g., DOCSIS MAC, OOB channels, MPEG, etc.) as well as media processors and other specialized SoC or ASIC devices. These additional components and functionality are well known to those of ordinary skill in the cable and embedded system fields, and accordingly not described further herein.

The device 500 of FIG. 5 is also provided with an OCAP 1.0-compliant monitor application and Java-based middleware which, inter alia, manages the operation of the device and applications running thereon, including implementing the download, application launch, and path configuration for network specific protocols as previously described herein. It will be recognized by those of ordinary skill that myriad different device and software architectures may be used consistent with the invention, the device of FIG. 5 being merely exemplary. For example, different middlewares (e.g., MHEG, or DASE) may be used in place of the OCAP middleware of the illustrated embodiment. Alternatively, the device 500 may comprises a wireless device coupled to the network via a wireless link (e.g., 802.11, Bluetooth, 3G, or even UWB) of sufficient data bandwidth.

It will also be appreciated that the device 500 of FIG. 5 may be integrated with other device of components, whether related to the content-based network over which the on-demand services are provided or otherwise. For example, the device 500 may be integrated with an MHP-compliant satellite receiver unit of the type well known in the art. The device 500 may also be integrated with a display device as well or in the alternative, so as to provide an "all-in-one" type form factor to the consumer.

It will further be appreciated that the extension protocols and associated techniques of the present invention can also advantageously be used in conjunction with (and without interfering with) other functions resident in the CPE, such as for example the hardware registry described in co-owned and co-pending U.S. patent application Ser. No. 10/723,959 filed Nov. 24, 2003 and entitled "METHODS AND APPARATUS FOR HARDWARE REGISTRATION IN A NETWORK DEVICE", the error logging functionality described in co-owned and co-pending U.S. patent application Ser. No. 10/722,206 filed Nov. 24, 2003 and entitled "METHODS AND APPARATUS FOR EVENT LOGGING IN AN INFORMATION NETWORK", and the display element management functionality described in co-owned and co-pending U.S. patent application Ser. No. 10/773,664 filed Feb. 6, 2004 and entitled "METHODS AND APPARATUS FOR DISPLAY ELEMENT MANAGEMENT IN AN INFORMATION NETWORK", each incorporated herein by reference in their entirety. For example, events or errors generated through access or manipulation of OD applications can be logged within the aforementioned error logging system for later use or analysis. As another alternative, setting the prefixes upon application launch (see FIG. 3) can be predicated upon notification from the hardware registry (or an access thereof by the application launched) that sufficient hardware or resources is/are present to support the OD capability of the application is present on the CPE. Similarly, the aforementioned display element (e.g., window) manager can be adapted to include the extended application within its visibility stack upon launch of the application. Myriad other possible uses and interactions between the various inventions are also possible, as will be recognized by those of ordinary skill.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A head-end apparatus for providing a network-specific on-demand application to consumer premises equipment (CPE) of said network, the apparatus comprising:
   at least one computer; and
   at least one computer program having a plurality of instructions for developing a specific protocol useful in implementing said on-demand application according to the method comprising:
      developing a set of first components to communicate between said head-end and said CPE, said communication comprising:
         establishing a communications session between said head-end and said CPE;
         specifying to said CPE a channel on which on-demand content may be accessed by said CPE; and sending or receiving at least one message regarding functional modes;

developing a set of second components to process said on-demand content delivered to said CPE; and developing a set of third components to cooperate with individual ones of said first and second components to control said functional modes specific to said on-demand application;

wherein each component of said set of first components, said set of second components, and said set of third components is associated with an individual one of a plurality of different multiple systems operator (MSO) environments; and wherein, in response to a request for a particular application from a CPE within an individual one of said plurality of different MSO environments, said computer program of said head-end apparatus further selects for assembly and delivery individual ones of said set of first components, said set of second components, and said set of third components said selection comprising selection of individual ones of said sets specific to said individual one of said plurality of different MSO environments.

2. Customer premises equipment (CPE) for operation within a content based network offering on-demand services according to at least one network-specific protocol, said CPE comprising:

a storage device; and a digital processor operatively coupled to said storage device, said digital processor for running at least one first software application stored on said storage device, said first software application having permissions from an OpenCable Application Platform (OCAP) monitor and comprising a plurality of components which, when executed on said processor:

communicate between said CPE and another entity of said network;

process the content delivered to said CPE; and enable a user of said CPE to control, via a user interface, playback of said content according to said network-specific protocol;

wherein at least one of said plurality of components comprises a shared component which is utilized by one or more second applications also having permissions from an OCAP monitor and simultaneously running on said CPE.

3. The CPE of claim 2, wherein said CPE comprises a digital settop box (DSTB) with Java-based middleware, and said at least one first software application comprises at least one class and at least one interface disposed within an application directory hierarchy.

4. The CPE of claim 3, wherein said CPE:

receives said at least one first application over said network; and subsequent to said receipt, launches said at least one first application to configure at least one path to at least one of said plurality of components.

5. The CPE of claim 4, wherein said CPE further comprises a plurality of said second applications, said plurality of said second applications being enabled to access said at least one component via at least one of said at least one configured paths.

6. A method of developing the specific protocol useful for delivery of content from a first node of a network to a second node thereof via a server entity of said first node, the method comprising:

receiving a plurality of media interface components, wherein individual ones of said components implement different ones of a plurality of network-specific protocol;

developing a configured application by selecting individual ones of said plurality of components to be utilized within a single software application; and developing at least one path to said selected individual ones of said plurality of media interface components, said path being accessible only to authorized entities;

wherein said at least one path and said media interface components cooperate to provide network specific on-demand services; and wherein multiple paths to said individual ones of said plurality of media interface components may be utilized to enable simultaneous use of said individual ones of said plurality of media interface components in multiple distinct software applications.

7. The method of claim 6, wherein said configured application is run on a consumer premises equipment (CPE).

8. The method of claim 7, wherein said act of developing a plurality of media interface components comprises developing a plurality of Java Media Framework components.

9. The method of claim 8, wherein said act of disposing said plurality of media interface components comprises disposing a plurality of classes and interfaces within the directory hierarchy structure of said application.

10. The method of claim 7, wherein said act of disposing said plurality of media interface components comprises:

providing said components to said CPE;

providing said software application to said CPE; and assembling said configured application at said CPE using at least said components and said software application.

11. The head-end apparatus of claim 1, wherein at least one of said first set of components comprises a Java DataSource.

12. The head-end apparatus of claim 11, wherein at least one of said second set of components comprises a Java MediaHandler.

13. The head-end apparatus of claim 12, wherein at least one of said third set of components comprises a controller which accesses said Java DataSource to cause said at least one message to be sent between said head-end and said CPE, said at least one message causing at least one corresponding functional mode to be invoked.

14. The head-end apparatus of claim 1, wherein said act of developing said set of second components further comprises developing a player component which implements at least one of said set of second components.

15. Customer premises equipment (CPE) for operation within a content delivery network offering one or more services each utilizing a network-specific protocol, said CPE comprising:

a storage device, said storage device for storing a plurality of components utilized by said one or more services thereon; and a digital processor in data communication with said storage device, said digital processor running a first software application and a plurality of second software applications, said first and said second software applications stored on said storage device;

wherein said first software application has permissions from an OCAP monitor application to permanently identify individual ones of said plurality of components within said CPE by attachment of prefixes to each; and wherein said plurality of second software applications utilize said prefixes to make use of said individual ones of said plurality of components, thereby sharing these across multiple applications.

16. The CPE of claim 15, wherein at least one of said plurality of second software applications comprises an application to:
    enable communication between said CPE and another entity of said network;
    process content delivered to said CPE; and
    enable a user of said CPE to control, via a user interface, playback of said content according to said network-specific protocol.

17. The CPE of claim 15, wherein said CPE comprises Java-based middleware.

18. The CPE of claim 17, wherein each of said plurality of second software applications utilizes a Java virtual machine (JVM), and said prefixes comprise Java media framework (JMF) commit prefixes, said commit prefixes of said individual ones of said plurality of components being called by said JVM to incorporate the functionality thereof.

19. The CPE of claim 15, wherein said individual ones of said plurality of components are arranged in a hierarchy such that said plurality of second software applications are only permitted access to certain ones of said plurality of components.

20. A method of developing one or more specific protocols useful for delivery of media content from a network, said method comprising:
    receiving at a consumer premises device a plurality of media interface components;
    modifying a path identifier of individual ones of said plurality of media interface components; and
    enabling said individual ones of said media interface components to be called by more than one software application via said modified path identifiers;
    wherein said individual ones of said plurality of media interface components are each useful with individual ones of said one or more specific protocols;
    wherein redundancy is eliminated by enabling said more than one software applications to be developed by calling one or more of said individual ones of said components via respective ones of said path identifiers simultaneously.

21. The method of claim 20, wherein each of said more than one software applications comprises a Java virtual machine (JVM) and is configured to call said individual ones of said plurality of media interface components via said modified path identifiers.

22. The method of claim 21, wherein said plurality of media interface components comprise Java Media Framework (JMF) components configured to:
    communicate between said consumer premises device and another entity of said network;
    process said media content delivered to said consumer premises device; and
    enable a user of said consumer premises device to control, via a user interface, playback of said media content according to one of said one or more specific protocols.

23. The method of claim 21, wherein said individual ones of said plurality of media interface components are each disposed within a directory hierarchy structure of a second application accessible to said more than one software applications.

* * * * *